United States Patent
Wardell

(10) Patent No.: US 6,431,164 B1
(45) Date of Patent: Aug. 13, 2002

(54) WATER CIRCULATED GRILL WITH GRILL STEAMER AND STEAM POT

(76) Inventor: Lawrence Wardell, 653 E. 4025 South, Salt Lake City, UT (US) 84107

( * ) Notice: Subject to any disclaimer, the term of this patent is extended or adjusted under 35 U.S.C. 154(b) by 0 days.

(21) Appl. No.: 09/723,372

(22) Filed: Nov. 28, 2000

(51) Int. Cl.[7] .................................................. F24C 13/00
(52) U.S. Cl. ........................ 126/5; 126/25 R; 126/41 R; 126/152 B; 126/20; 99/425; 99/400; 99/445
(58) Field of Search ............................ 126/5, 25 R, 29, 126/152 R, 152 B, 20, 34, 344, 54, 164, 30, 41 R, 299 F, 53; 122/371, 374; 108/50.18; 99/425, 400, 408, 445, 446, 450, 444, 482

(56) References Cited

U.S. PATENT DOCUMENTS

| | | | | |
|---|---|---|---|---|
| 4,632,089 A | * | 12/1986 | Wardell | 126/25 R |
| 4,913,039 A | * | 4/1990 | Stuphen | 99/339 |
| 5,009,151 A | * | 4/1991 | Hungerford | 99/445 |
| 5,044,266 A | * | 9/1991 | Geogaris | 99/446 |
| 5,189,945 A | * | 3/1993 | Hennick | 126/25 R |
| 5,211,105 A | * | 5/1993 | Liu | 99/400 |
| 5,363,752 A | * | 11/1994 | Weil | 99/445 |
| 5,718,165 A | * | 2/1998 | Winstead | 99/400 |
| 6,076,451 A | * | 6/2000 | Studer | 99/340 |
| 6,158,426 A | * | 12/2000 | Wardell | 126/25 R |

FOREIGN PATENT DOCUMENTS

DE 37 02 455 A * 8/1988

* cited by examiner

*Primary Examiner*—Henry Bennett
*Assistant Examiner*—Josiah C. Cocks

(57) ABSTRACT

A water circulated grill including a housing containing spaced apart food supporting tubes and with a water catching system including spaced apart collection troughs to receive condensed water dropping from the sides of the water cooled supporting tubes, a steamer positioned beneath the water cooled food supporting tubes and above a heat supply source, whereby the heat supply source will heat the steamer to generate steam that moves between collection troughs to cook food placed on the tubes and wherein a water source supplying water to the steamer also supplies water to a water chamber of a steamer pot that has a burner receiving fuel from the same source that supplies fuel to the heat source.

7 Claims, 3 Drawing Sheets

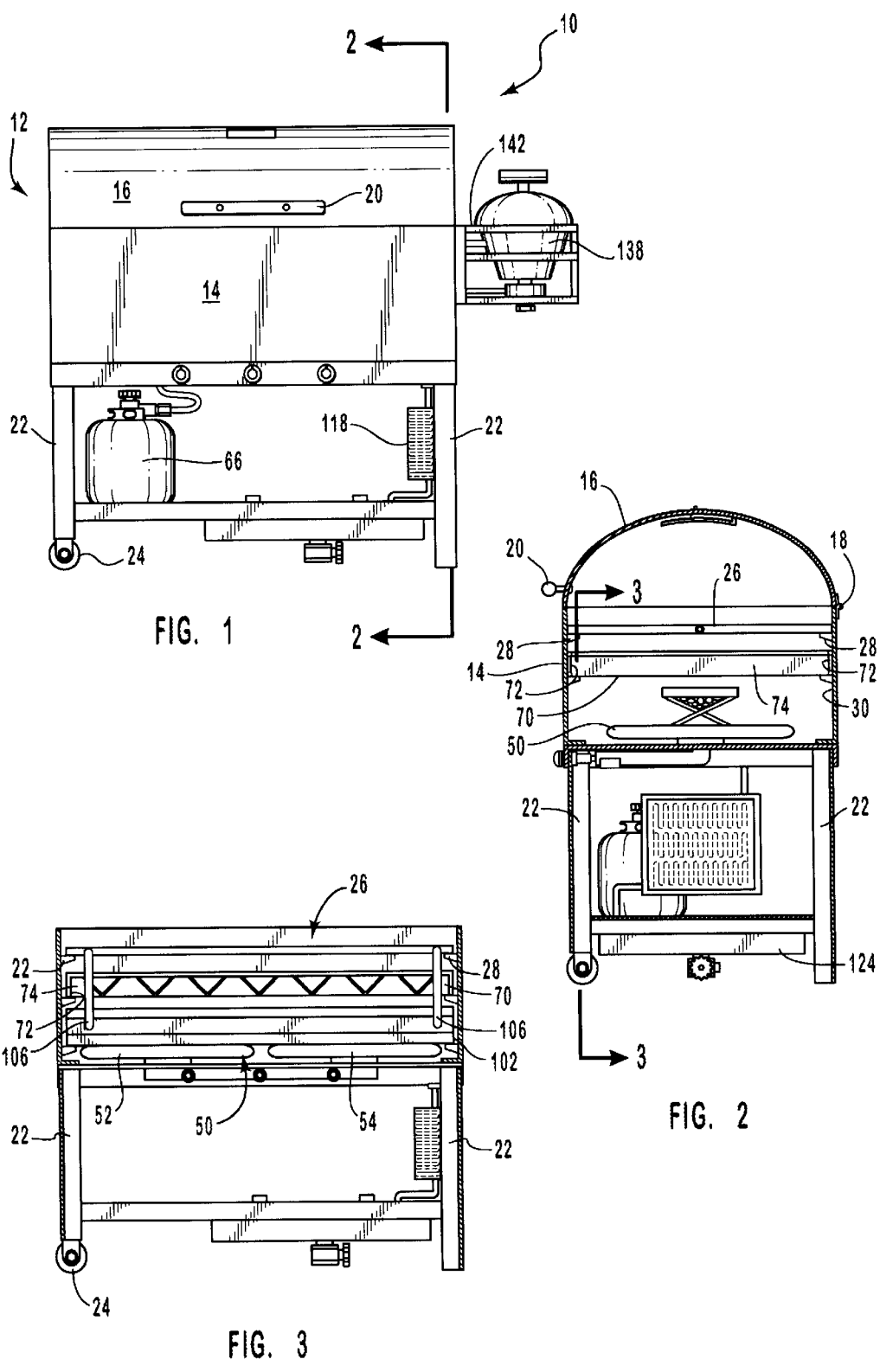

WATER CIRCULATED GRILL WITH GRILL STEAMER AND STEAM POT

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Figure 4:
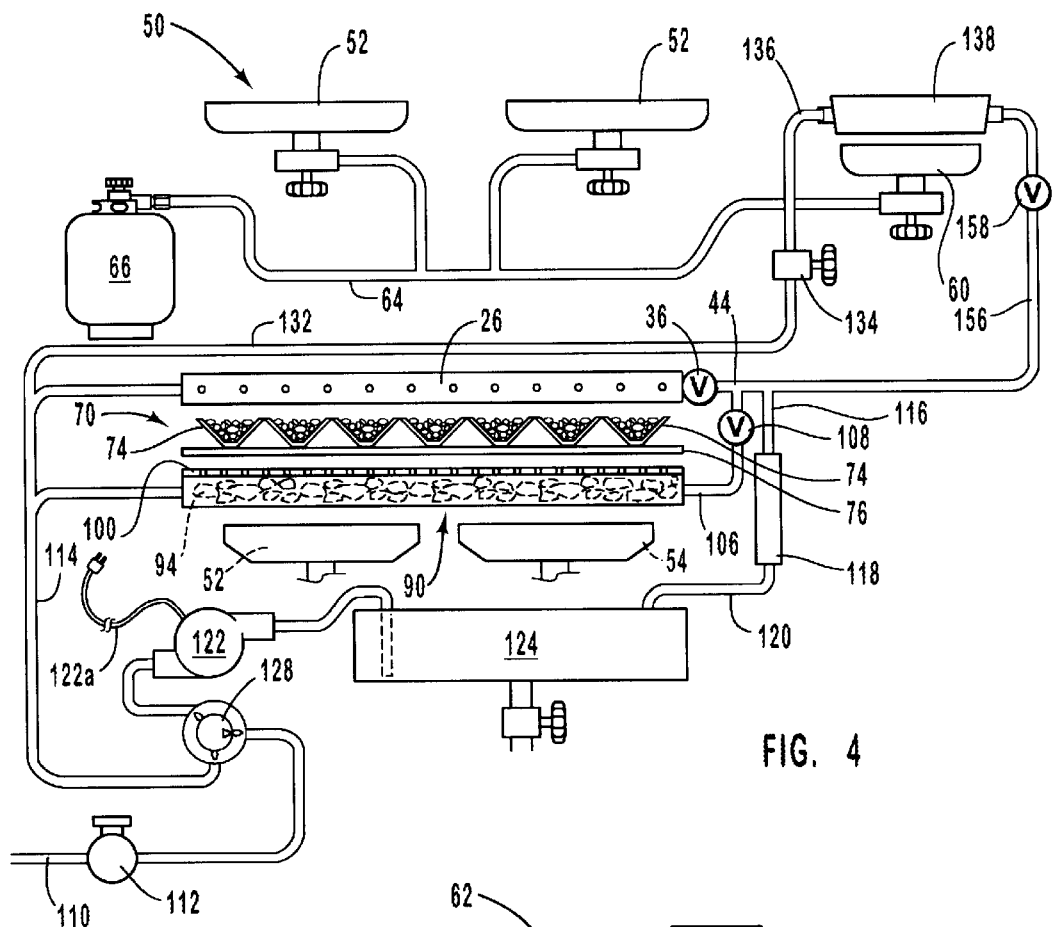

This invention relates to barbecue grills and is particularly concerned with such grills having a water circulating system for maintaining food support systems cool and clean as food therein is cooked. Grills of the type described are disclosed in U.S. Pat. Nos. 4,632,089 and 6,158,426.

BRIEF SUMMARY OF THE INVENTION

It has been found that with food cooking grills having water circulating systems for maintaining the food support systems thereof cool and clean as the food is cooked water collects on the cooled food support systems and falls along with grease and drippings from the food being cooked onto the heat source for the grill. The dropped water, along with the drippings from the food can significantly adversely affect the efficiency of the heat source. Both water and food drippings accumulating on the heat source have proven to be damaging, with time, to the burners or other heat sources used. The water droplets may be heated to form steam, but the steam formed may include smoke and grease that has also been formed as the material dropped onto the heat source is heated. Consequently, the materials dropped onto the heat source may burn and smoke and the water component may steam and evaporate only to condense and provide a grease coating on the interior of the somewhat cooler grill housing. Periodically, thereafter, the accumulated coating must be removed for cleanliness and sanitation reasons Principal objects of the present invention are to provide a barbecue grill having cooking grid with a water circulating food support system that will remain cool and clean, even as food is cooked on the support system; that will collect water condensing on and falling from the food support system without collecting significant amounts of food drippings from food cooked on the food support system; that will protect the heat source of the grid from the water and food drippings; that will provide for steam assisted cooking and flavoring of food on the support system sand steaming of separately processed foods in a steam pot.

Principal features of the invention include a barbecue grill having a housing within which food is cooked while resting on a cooking grid. The cooking grid is formed as interconnected tubes through which water is circulated. Food to be cooked is placed on a top surface of the grid. A heat source, which may be a burner or a plurality of burners supplied with fuel, such as propane, is positioned in a lower portion of the housing. A drip water collector, comprising a plurality of interconnected, spaced apart collection troughs, is positioned in the housing, between the cooking grid and the heat source. Each collection trough is positioned beneath at least one water circulating tube of the cooking grid and will receive water collecting on the water circulating tube(s) thereabove and dropping from the tube(s). Each collection trough extends from a bottom upwardly on opposite sides to terminate in side edges positioned just outside the outermost sides of the water circulating tube(s) positioned above the trough. The collection troughs making up the drip water collector are spaced apart and are held together by support members to which the collection troughs are connected.

With the drip water collector spaced beneath the cooking grid and the collection troughs beneath water circulating tubes, water condensing on and falling from the water circulating tubes is caught in the collection troughs, which are heated by the heat source. The water caught in the collection troughs forms steam that rises from the collection troughs to be used in the cooking of food on the cooking grid. At the same time additional steam is passed upwardly between the spaced apart collection troughs and the spaced apart water circulating tubes to assist in cooking the food placed on the cooking grid. The additional steam is generated by heat from the heat source acting on the walls of a steamer that is centrally positioned beneath each of the collection troughs.

The steamer is elongate and includes a body that is filled with flavor chips and water. As the steamer is heated by the heat source the water turns to steam and the steam and absorbed flavors in the steam resulting from heating of the water soaked flavor chips is passed upwardly through holes in a top cover of the steamer. Heat from the heat source passes around the steamer while heating the walls thereof and generating flavored steam and between the collection troughs to heat the troughs to generate steam from water collecting in the troughs and to cook food placed on the cooking grid. At the same time a steamer pot, using the common water supply source supplying water to the cooking grid and the steamer is used to process foods placed in the steamer pot.

The common water supply is selected from a connected outside pressurized water source or from a closed water system including a reservoir, a circulating pump and a radiator cooler.

Droppings from food being cooked on the cooking grid falls from the food between the water circulating tubes and between the water collection troughs to the top cover of the steamer, with only a small amount of such droppings passing the steamer and onto the burners or other components of the heat source. The top cover of the steamer is easily removed and scraped or washed clean of any grease accumulation, as may be necessary to maintain effective cooking and to extend the life of the heat source.

Other objects and features of the invention will become apparent to those skilled in the art to which the invention pertains from the following detailed description and drawings, disclosing what is presently contemplated as being the best mode of the invention.

DRAWINGS

Figure 5:
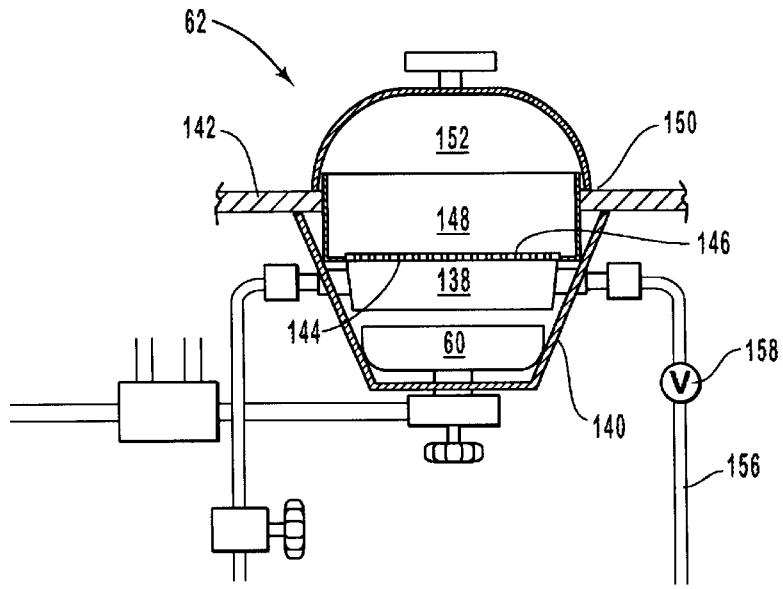
Figure 7:
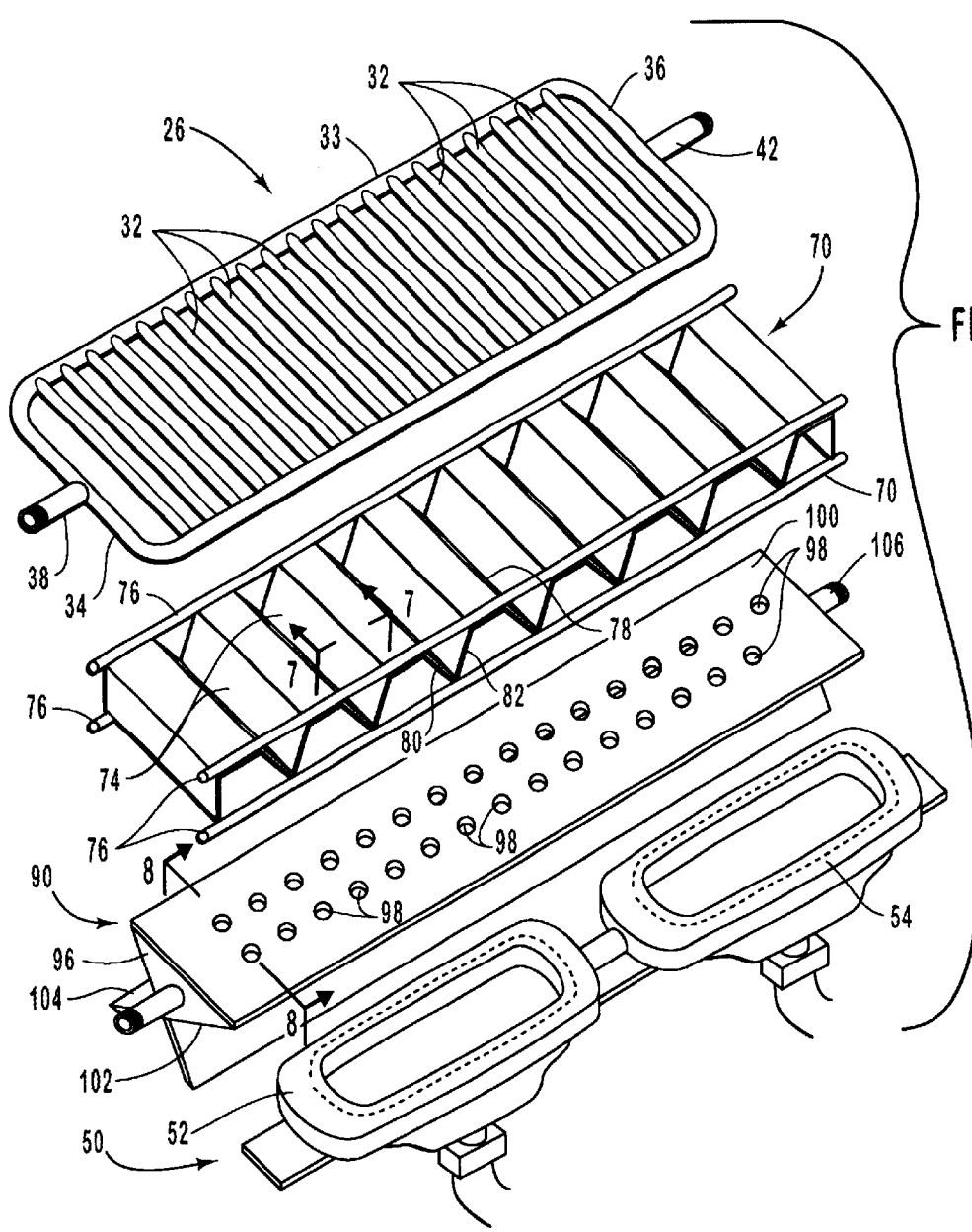
Figure 8:
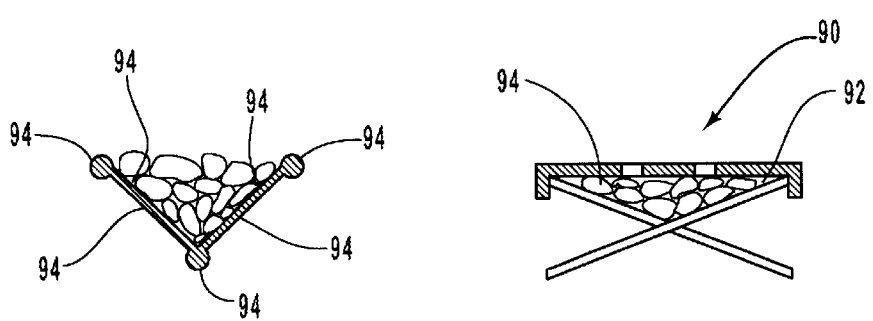

In the drawings:

FIG. 1 is a front elevation of a typical barbecue grill of the invention;

FIG. 2, a vertical section view, taken on the line 2—2 of FIG. 1;

FIG. 3, a vertical section view, taken on the line 3—3 of FIG. 1;

FIG. 4, a schematic diagram of the components of the invention with the burners shown connected to the fuel tank and again positioned beneath the steamer;

FIG. 5, an enlarged side elevation view of the steamer pot of the invention;

FIG. 6, an exploded view of the cooking grid, collection troughs, steamer and heat source of the invention;

FIG. 7, a transverse section view taken on the line 7—7 of FIG. 5, through a collection trough of the barbecue grill; and FIG. 8, a transverse section view, taken on the line 8—8 of FIG. 5, through the steamer of the barbecue grill.

DETAILED DESCRIPTION

Referring now to the drawings:

In the illustrated preferred embodiment of the invention, the barbecue grill is shown generally at 10. As shown, the grill 10 includes a housing 12 with a base 14 and a hood 16 hinged to base 14 at hinge 18. A handle 20 on the hood 16 allows a user to pivot the hood about hinge 18 for access to the interior of housing 12. Legs 22 project downwardly from base 14 and some or all of the legs may be provided with a wheel 24 to facilitate movement of the grill 10.

A cooking grid, 26 is shown resting on ribs 28 provided on the inside wall 30 of base 14. Cooking grid 26 includes a plurality of spaced apart tubes 32 with their opposite ends spaced apart and side tubes 33 that have ends connected into end tubes 34 and 36. End tube 34 has a coupling 38 that connects the tube to a water inlet tube 40. End tube 36 has a coupling 42 that connects the tube to a discharge line 44. Water supplied to tube 34 through inlet tube 40 is circulated through the tubes 32, 33, 34 and 36 and tube 44 to discharge.

A heat source 50, including a pair of burners 52 and 54 is provided in the bottom of base 14. The burners 52 and 54 and a burner 60 of a steamer pot 62 are connected by a hose 64 to a fuel source such as a propane tank 66.

A drip water collector 70 is positioned in the base 14, between the cooking grid 26 and the heat source 50. The drip water collector is supported on ribs 72 formed on the inside wall 30 of base 14. The drip water collector is formed with spaced apart collection troughs 74, interconnected by spaced apart rods 76. Collection troughs 74 are each positioned to have a low, central length 78 directly beneath at least one tube 32. As shown upwardly extending wings 80 and 82, extend from the central length outwardly to side edges 84 and 86 that are positioned just below the outermost sides of a pair of adjacent tubes 32 that are above the collection trough 74. So arranged and positioned the collection troughs 74 will collect water condensing on and falling from the tubes 32.

A steamer 90 is positioned between the heat source and the drip water collector 70. Steamer 90 includes a bin 92 that extends transversely beneath the spaced apart collection troughs 74. Flavor chips 94, which may be hickory, pine or other wood chips are placed in bin 92. Water is introduced into bin 92 through an inlet conduit 96 to soak the flavor chips and upon heating of the steamer by the heat source 50 the water in the bin is turned to steam that absorbs the flavor of the flavor chips. The generated steam passes through holes 98 in a top cover 100 of the bin 92. Top cover 100 lips over side and end walls 102 and 104, respectively, of the bin 92, and is lifted off the bin to allow placement of the flavor chips 94 and for easy cleaning of the top surface of the top cover. An outlet conduit 106 is connected into the bin 92 and a pressure responsive valve 108 in the conduit 106 will open to allow water flow from the bin 92 should the pressure in the bin 92 approach an unsafe level.

The side walls 102 of the bin 92 of steamer 90 extend downwardly and outwardly from the center bottom of bin 92 to serve as supports 104 for the bin and as heat collectors to be heated by the heat source 50. The supports 104 transmit the heat to the bin 92 and the water and flavor chips in the bin. Supports 104 rest on ribs 106 formed in the inside wall 30 of base 14 of the housing 12.

Water to end tube 34 of the cooking grid 26 is supplied through a conventional water pressure line 110, a main valve 112 and a connector line 114 connected to the line 40. Connector line 114 is also connected to inlet conduit 94 of the steamer 90. Discharge line 36 of the cooking grid and outlet conduit 106 of the steamer 90 are each connected to an inlet pipe 116 of a cooling radiator 118. An outlet pipe 120 of the cooling radiator discharges into a storage reservoir tank 122 that is suspended from bottom shelf 124 of the grill 10. A valved drain line 123 is provided in the bottom of reservoir tank 122. In the event a pressurized water source 110 is not available or if the grill is to be used without connection to a pressurized water source a pump 122, having an electrical cord 124 to be plugged into a conventional electrical outlet, is turned on to pump water through a selector valve 128 and the line 114 into the cooking grid 26 and the steamer 90 before being returned to the reservoir tank 122.

Main valve 112 is arranged to be cam operated and to open upon opening of the control valve 130 of the propane tank 66. Selector valve 128 is turned to allow flow from the pressurized water source to connector line 114 or to shut off such flow and to allow flow from pump 122 to connector line 114.

Line 114 is also connected to a conduit 132 to supply water through an on-off valve 134 to the inlet 136 of steamer pot 62.

Steamer pot 62 includes a water chamber 138, receiving water from inlet 136 and being supported by angled walls 140 above the burner 60. Angled walls 140 extend downwardly and inwardly towards one another, from a shelf 142 that is cantilevered from base 14 of the grill 10. Water chamber 138 has a perforated top cover 144 that is removable to permit placement of flavor chips into the water chamber. Water in the water chamber 138 is heated by burner 60 to form steam that passes through the perforations in the top cover and perforations 146 in a cook pot 148. Cook pot 148 is removably inserted through a hole 150 in the shelf 142 to be suspended above the water chamber 138. Vegetables and/or other foods to be steamed are placed in the cook pot 148 and are steamed by steam generated in the water chamber 138 and passing through the perforations in top cover 144 and cook pot 148. A domed cover 152 removably fits over the cook pot to cover the food placed in the cook pot and to circulate the steam around and through the food.

A return conduit 156 connects water chamber 138 and the cooling radiator 118 and a pressure responsive valve 158 in the conduit 156 opens to allow flow from the water chamber to the radiator while preventing dangerous pressure build-up in the water chamber.

Valves 160 and 162 control flow from propane tank 66 to the burners 52 and 54 and valve 164 controlling flow from tank 66 to burner 60, respectively, have control knobs 166, 168 and 170 mounted to a front face of base 14 of the grill 10.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A water circulated grill comprising a housing, including means providing access to the interior of said housing;

a water cooled grid having spaced apart tubes for water flow serving as a food support in said housing;

a source of heat in said housing and positioned beneath said water cooled grid;

a drip water collector positioned in said housing between said water cooled grid and said source of heat, said drip water collector including spaced apart water collection troughs, with each said trough being positioned beneath at least one spaced apart tube of said water cooled grid and each said collection trough including a low, central length and upwardly and outwardly wings terminating in edges positioned just outside the outermost sides of the spaced apart tubes positioned above said water collection trough;

a steamer positioned above said source of heat and below said drip water collector and including means to generate steam upon being heated by said source of heat;

water-soaked flavor chips in the steamer providing flavor to the generated steam; and a source of pressurized water coupled to the water cooled grid and to the steamer; and wherein the steamer includes an elongate bin, with a removable top cover and perforations through said top cover to allow steam generated in said bin to pass though said top cover, whereby said generated steam passes between troughs of the drip water collector and the water cooled grid to engage food items on the said water cooled grid.

2. A water circulated grill as in claim 1, wherein the source of pressurized water includes a reservoir tank and a pump providing water from said reservoir tank to the water cooled grid and steamer.

3. A water circulated grill as in claim 2, further including conduit means connected between the water cooled grid and the reservoir and between the steamer and the reservoir to return water from said grid to said reservoir and including a water cooler in said conduit means to cool water from said water cooled grid and said steamer before said water enters said reservoir.

4. A water circulated grill as in claim 3, further including a steamer pot affixed to the housing of the grill, said steamer pot including a burner, a water chamber above said burner, a cook pot above said water chamber having perforations to allow steam from said water chamber to enter said cook pot, a lid for said cook pot and means to supply water to said water chamber.

5. A water circulated grill as in claim 4, wherein the water chamber has a perforated, removable top cover, and flavor chips in said water chamber.

6. A water circulated grill as in claim 5, further including a shelf cantilevered from the housing and having a hole therethrough, the cook pot fitting into and removably held in said hole above the water chamber, and wherein the lid for the cook pot is domed.

7. A water circulated grill as in claim 6, further including conduit means having a control valve therein connected between the inlet to the water cooled grid and the water chamber and conduit means having a pressure relief valve therein connected between said water chamber and the water cooler.

* * * * *